April 23, 1968  F. C. MAGNE ET AL  3,379,551
MORPHOLIDES OF MIXTURES OF EPOXIDIZED, SATURATED, AND
POLYUNSATURATED FATTY ACIDS
Original Filed Jan. 15, 1962
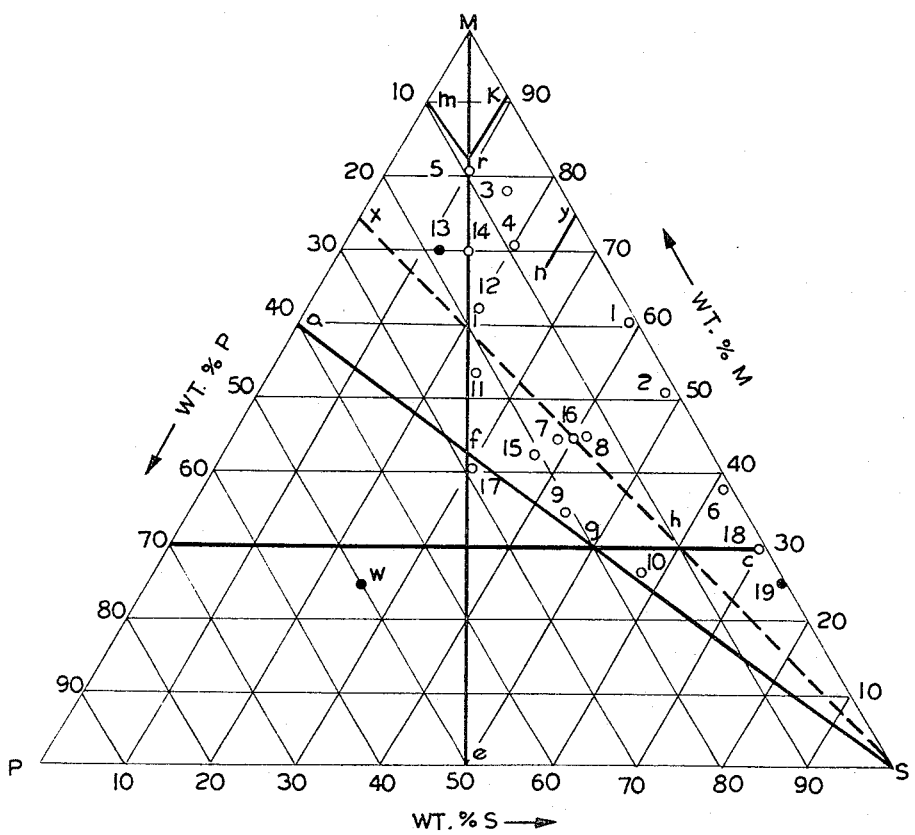
INVENTORS
FRANK C. MAGNE
EVALD L. SKAU
ROBERT R. MOD
BY
*R. Hoffman*
ATTORNEY

3,379,551
MORPHOLIDES OF MIXTURES OF EPOXIDIZED, SATURATED, AND POLYUNSATURATED FATTY ACIDS

Frank C. Magne, Evald L. Skau, and Robert R. Mod, New Orleans, La., assignors to the United States of America as represented by the Secretary of Agriculture
Original application Jan. 15, 1962, Ser. No. 166,742, now Patent No. 3,219,664, dated Nov. 23, 1965. Divided and this application Apr. 2, 1965, Ser. No. 445,284
1 Claim. (Cl. 106—316)

This application is a division of application Ser. No. 166,742, filed Jan. 15, 1962, now U.S. Patent No. 3,219,664.

A non-exclusive, irrevocable, royalty-free license in the invention herein described, throughout the world for all purposes of the United States Government, with the power to grant sublicenses for such purposes, is hereby granted to the Government of the United States of America.

This invention relates to unique mixed morpholides. More particularly, the invention provides the morpholides of mixtures of long chain saturated and unsaturated fatty acids and the epoxy derivatives thereof that can reproducibly be produced from the fatty acids found in natural glycerides. These mixed morpholides are efficient primary solvent plasticizers exhibiting good compatibility with polymers and copolymers of vinyl chloride.

A morpholide of an acid is an amide of the acid in which the amido nitrogen atom is a nitrogen atom of a morpholine ring. Prior workers have produced the morpholides and other amides of various individual fatty acids and mixtures of fatty acids. Many of the fatty acid amides heretofore produced, e.g., those disclosed in U.S. Patents 1,986,854; 2,339,056; and 2,380,925; are solvent plasticizers for hydrophilic vinyl resins, such as the polyvinyl acetal resins.

A compound which is a solvent plasticizer for, and thus is compatible with, a hydrophilic vinyl resin such as a polyvinyl acetal resin, exhibits only a very limited compatibility with a hydrophobic vinyl resin such as a polyvinyl chloride. If a resin is plasticized with a compound with which it has only a limited compatibility the plasticizer soon exudes or migrates to the surface unless the plasticizer is used in limited amount or is used in conjunction with a mutual solvent, to obtain adequate compatibility.

As might be expected from the known compatibility of various morpholides of fatty acids with the polyvinyl acetals, the morpholide mixtures from glyceride oil acids such as cottonseed oil acids or peanut oil acids, although in other respects satisfactory vinyl chloride resin plasticizers, are highly incompatible with polymers of vinyl chloride, even when used as a secondary plasticizer with an equal amount of a highly capatible plasticizer.

Similarly, the morpholide of palmitic acid and the morpholide of stearic acid, though in other respects satisfactory vinyl chloride plasticizers, have been found to be highly incompatible when used as plasticizers for vinyl chloride resins, exhibiting migration to the surface within 36 hours.

The term "vinyl chloride resins" is used throughout the specification and claims to refer to polymers and copolymers of monomers containing vinyl chloride in a predominant proportion in parts by weight. Terms such as "good compatibility," "compatible," and "compatible plasticizers" in reference to plasticizers for vinyl chloride resins are used throughout the specification to refer to plasticizers which show no signs of exudation or migration to the surface for at least 30 days when the plasticizer is present in the proportion of about 70 parts per 100 parts by weight of vinyl chloride resin.

The primary object of the present invention is to provide mixed morpholides which are good primary solvent plasticizers for vinyl chloride resins, and which are plasticizers that can economically be produced from fatty acids obtainable from glyceridic oils and fats.

The mixed morpholides provided by this invention exhibit good compatibility with polymers and copolymers of monomers predominating in vinyl chloride, such as polyvinyl chloride, and the vinyl chloride-vinyl acetate copolymers predominating in vinyl chloride. They may be employed as plasticizers in proportions of from 10 to about 70 parts by weight per 100 parts by weight of polymer. Their plasticizing efficiency is high and the resulting plasticized resins have good thermal and light stability, good low-temperature properties, and a low volatility loss.

In U.S. Patent No. 2,863,845 it was disclosed that the morpholides of mixed saturated and unsaturated vegetable oil fatty acids in which mixtures of acids the weight proportions of saturated acids (S), monoolefinic acids (M), polyolefinic acids (P), and epoxidized fatty acids (E), are such that $S/S+M+P+E$ is from about $$\frac{1 \text{ to } 9}{100}$$

and $P/M+P+E$ is less than about $1/10$, the value of E being zero when no epoxidized fatty acids are present in the fatty acid mixture, are good compatible plasticizers for vinyl chloride resins. The term "epoxidized fatty acids" is used to designate $C_{12}$ to $C_{22}$ alkanoic and alkenoic acids containing at least one epoxy group. Such acids are produced by the epoxidation of at least one olefinic group of an unsaturated fatty acid.

In copending patent application Ser. No. 79,470 filed Dec. 29, 1960, and now U.S. Patent No. 3,066,111, it was further disclosed that the morpholide mixtures obtained by reacting morpholine with mixtures of the fatty acids which occur in selectively hydrogenated cottonseed oil, said morpholide mixtures containing a proportion of saturated, monounsaturated, and polyunsaturated acyls; i.e., acyls obtainable from selectively hydrogenated cottonseed oil, such that the acyls are equivalent to a mixture of acids in which $S/S+M+P$ is about $25/100$ and $P/M+P$ is less than $1/10$ are good compatible plasticizers for vinyl chloride resins.

We have now made the surprising discovery that morpholide mixtures of morpholides of vegetable oil fatty acids containing a proportion of saturated, monounsaturated, and polyunsaturated acyls such that the acyl mixture is equivalent to a mixture of acids in which $P/M+P$ is much larger than $1/10$ are compatible plasticizers for vinyl resins provided the value of $S/S+M+P$ lies within a specified range which depends on the value of $P/M+P$ and provided also that the saturated acyls present in the morpholide mixture are predominantly saturated acyls containing from 12 to 18 carbon atoms and that the percentage of saturated acyls containing 18 or more carbon atoms in the morpholide mixture amounts to less than about 17% of all the acyls in the morpholide mixture. For example, as can be seen from the examples and the figure (in which figure, as described below, all compositions within the approximate boundaries of area M*fgc* are compatible), morpholide mixtures of saturated, monounsaturated, and polyunsaturated morpholides for which $P/M+P=25/100$ (represented by the compositions along the straight line joining $x$ and S) are compatible only between $i$ and $h$; that is, only if the value of $S/S+M+P$ lies between about $20/100$ and $60/100$ and provided also that the saturated acyls present in the morpholide mixture are predominantly saturated acyls containing from 12 to 18 carbon atoms, and that the percentage of saturated acyls containing 18 or more carbon atoms in the morpholide mixture amounts to less than about 17% of all the acyls in the morpholide. This is surprising since, as is obvious from the figure, such as compatible plasticizing mixtures can be prepared by mixing two incompatible plasticizers; i.e., for example, by mixing equal weights of the compositions represented by S and $x$, each of which is incompatible, or in general, by mixing the compositions represented by S and $x$ in any proportion between about 1 and 6 parts by weight of $x$ to 4 parts by weight of S.

Similarly we have also discovered that morpholide mixtures of morpholides of vegetable oil fatty acids in which $S/S+M+P$ is much larger than $25/100$ are compatible vinyl plasticizers provided the ratio $P/M+P$ lies within a specified range of values and provided also that the saturated acyls present in the morpholide mixture are predominantly saturated acyls containing from 12 to 18 carbon atoms and that the percentage of saturated acyls containing 18 or more carbon atoms in the morpholide mixture amounts to less than about 17% of all the acyls in the morpholide mixture. This is surprising since it shows, as can be seen from the figure, that compatible plasticizers represented by the compositions within area M$fgc$ can be obtained by mixing (in appropriate proportions) two incompatible plasticizers, e.g., those represented by compositions in areas M$rfa$ and $cg$S, respectively.

We have also discovered that morpholide mixtures of the morpholides of saturated, polyunsaturated, and epoxidized fatty acids in which $S/S+M+P+E$ is much larger than $9/100$ and $P/M+P+E$ is much larger than $1/10$ but which are compatible vinyl chloride resin plasticizers can be made by mixing two incompatible morpholide mixtures, provided that the saturated acyls present in the morpholide mixture are predominately saturated acyls containing from 12 to 18 carbon atoms, and that the percentage of saturated acyls containing 18 or more carbon atoms in the morpholide mixture amounts to less than about 17% of all the acyls in the morpholide mixture. For example, the composition represented by Example 43, for which $P/M+P+E$=about $35/100$ and the composition represented by Example 40, for which $S/S+M+P+E$=about $75/100$ are individually incompatible, but a mixture of equal parts of these compositions (Example 46), for which $E/E+S=54/100$ and $$E/P+E=72/100$$

is compatible.

The mixed morpholides of this invention comprise morpholide mixtures of the morpholides of mixed saturated and unsaturated fatty acids, in which mixture of acids, the weight proportions of saturated acids (S), monoolefinic acids (M), and polyolefinic acids (P), are such that the following conditions are satisfied: (1) that $S/S+P$ is greater than about $50/100$ (i.e., that the composition lies within area M$e$S in the figure), (2) that $M/S+M+P$ is greater than about $30/100$ (i.e., that the composition lies within area M$bc$), and (3) that $P/M+P$ is less than about $40/100$ (i.e., that the composition lies within area M$a$S), excluding those mixtures which are such that $S/S+M+P$ is either less than about $9/100$ or equal to about $25/100$ and $P/M+P$ is less than about $1/10$ (i.e., excluding compositions lying within the area M$rk$ or on the line $ny$); provided also that the saturated acyls present in the morpholide mixture are predominantly saturated acyls containing from 12 to 18 carbon atoms, and that the percentage of saturated acyls containing 18 or more carbon atoms in the morpholide mixture amounts to less than about 17% of all the acyls in the morpholide mixture. Thus, the mixed morpholides of this invention comprise compositions represented by all compositions within the area $krfgc$ in the figure, except along $ny$; that is, the area which is common to the areas M$e$S, M$bc$, and M$a$S, excluding those within the area M$rk$ and along line $ny$.

The morpholides of this invention also include the morpholides of epoxidized fatty acids. They also include the morpholides of mixtures of epoxidized fatty acids with saturated acids and/or polyunsaturated fatty acids in which mixtures of acids, the weight proportions of saturated acids (S), epoxidized acids (E), and polyunsaturated acids (P), are such that the following conditions are satisfied: (1) that $E/S+E$ is greater than about $50/100$; (2) that $E/P+E$ is greater than about $70/100$; and (3) that the saturated acids present in the mixture of acids are predominantly saturated acids containing from 12 to 18 carbon atoms and the percentage of saturated acids containing 18 or more carbon atoms in said mixture of acids is less than about 17% of all the acids in the mixture.

While the morpholides of this invention can be produced in a variety of ways, they are preferably produced by reacting the mixed acids with morpholine. The mixed acids are preferably produced by saponifying a natural glyceride, acidifying the resulting salts and, if necessary, adjusting the composition of the resulting acid mixture so as to obtain a suitable composition which when reacted with morpholine will result in a compatible plasticizer (1) by known procedures for reducing the proportion of saturated acyls such as fractional crystallization or distillation, and/or (2) converting polyunsaturated acyls to monounsaturated acyls, epoxyalkenoic acyls or epoxyalkanoic acyls—the corresponding morpholides of which are themselves compatible plasticizers—such as by hydrogenation, halogenation, formylation, dimerization, or epoxidation, etc., and/or (3) by admixing with other fatty acid mixtures and/or with pure fatty acids. Alternatively, the fractionation, hydrogenation, epoxidation or mixing, etc., may be performed on the materials separately or combined which are capable of yielding the desired acid composition or on the corresponding morpholides or mixed morpholides. In general, it is usually preferred to perform epoxidation at the morpholide stage.

The necessary adjustment can readily be deduced from the figure and from a knowledge of the proportions of S, M, and P acyls in the given mixture as determined by standard analytical procedures. For example, consider a mixture of vegetable oil fatty acids in which the weight proportions are such that $S/S+P$ is about $35/100$; $P/M+P$ is about $65/100$; $M/S+M+P$ is about $25/100$; and in which the predominant saturated fatty acid is the $C_{16}$ acid with very small amounts of the $C_{14}$ and $C_{18}$ acids. The figure shows that the mixed morpholides made from this mixture (represented approximately by $w$ in the figure) would be incompatible. The figure also shows that this mixture of fatty acids can be readily converted to a suitable mixture of acids (i.e., to a composition represented by points within area M$fgc$), which when reacted with morpholine will result in a compatible plasticizer; for example, by converting some or all of the polyunsaturated acyls to monounsaturated acyls by such procedures as hydrogenation, halogenation, formylation, dimerization, maleination etc., so that $S/S+P$ is greater than about $50/100$, $M/S+M+P$ is greater than about $30/100$, and $P/M+P$ is less than about $40/100$.

The composition of the morpholide mixtures of this invention which contain no epoxidized acyls are represented by all compositions within the area M$fgc$ in the figure; that is, within the area bounded approximately by M$f$, $fg$, and $gc$. The boundaries M$f$, $fg$, and $gc$ are only approximate. Thus the composition of Example 10 which lies near the boundary outside this area was compatible. Slightly incompatible compositions lying close to but outside the boundaries M$f$, $fg$, and $gc$ and even less compatible compositions may be used satisfactorily as primary plasticizers in polyvinyl chloride resin formulations containing lower percentages of plasticizer and/or as secondary plasticizers admixed with a suitable compatibilizing plasticizer such as the morpholide of epoxidized fatty acids or compatible mixtures of the morpholides of epoxidized fatty acids and/or monounsaturated fatty acids and/or polyunsaturated fatty acids and/or saturated fatty acids. Similarly incompatible morpholide mixtures containing the morpholides of epoxidized fatty acids can be used as secondary plasticizers with compatible morpholide compositions which lie within the area M$fgc$ in the figure.

The proportion of saturated fatty acyls having 18 or more carbon atoms in the chain which can be present in the saturated acyl fraction without causing incompatibility will vary with the overall composition of the morpholide mixture particularly the relative proportions of saturated, monounsaturated, and polyunsaturated acyls present in the mixture. It can be determined for a given overall composition by evaluating the performance of a series of samples which differ only in the proportion of the $C_{18}$ or longer-chain saturated fatty acyls in the saturated fatty acyls present.

We have also discovered that the morpholides of epoxidized fatty acids, i.e., of $C_{16}$ to $C_{22}$ alkanoic or alkenoic acids containing at least one epoxy group, are compatible, highly efficient, primary plasticizers for vinyl chloride resins and impart to the plasticized resin a high degree of stability against heat and light. They are efficient stabilizers for vinyl chloride resins. We have also discovered that morpholide mixtures such as can be made by mixing even as much as about one part of the morpholide of palmitic acid with one part of the morpholide of epoxidized fatty acids or by mixing as much as about 3 parts of the morpholide of polyunsaturated fatty acids with 7 parts of the morpholide of epoxidized fatty acids were also found to be compatible vinyl chloride resin plasticizers and have the advantage that the plasticized resin has increased thermal stability.

Morpholide mixtures which can be prepared by mixing in any proportion any of the compatible morpholide compositions within the area M$fgc$ in the figure with either the morpholides of epoxidized fatty acids or with any mixture of morpholides of fatty acids containing the morpholide of epoxidized fatty acids which mixture of morpholides is itself a compatible vinyl chloride plasticizer are also compatible vinyl chloride plasticizers imparting good thermal stability to the resin. In making such compatible morpholide mixtures the morpholides of epoxidized fatty acids may be introduced by addition or they may be formed in situ; for example, by epoxidizing some of the morpholides of the monounsaturated or polyunsaturated fatty acids in a given morpholide mixture.

The following examples numbered 1 through 46, the data for which are listed singly in tabular form but which may be considered individually or in related groups for discussion purposes, will demonstrate several of the manifold expressions of our invention.

Various morpholide mixtures were tested as plasticizers for vinyl chloride-vinyl acetate (95–5) copolymer resin (Vinylite VYDR) in a standard formulation comprising: 63.5% of Vinylite VYDR, 35% plasticizer, 0.5% stearic acid, and 1.0% basic lead carbonate. This formulation for each morpholide sample was milled, molded, and tested. In all examples, the sample was rated as incompatible if the molded stock showed any evidence of exudation or migration to the surface during a shelf storage of 30 days.

The morpholide mixtures used in Examples 1 to 19 were ternary compositions prepared by mixing appropriate proportions of the morpholide of oleic acid, the morpholide of linoleic acid, and the morpholide of palmitic acid. The approximate compositions and the results of the compatibility test for these samples are given in Table I and plotted as points in the ternary weight-composition diagram in the figure. In this figure compatible morpholide mixtures are represented by open circles and incompatible mixtures by black circles. In Table I, M, S, and P represent the weight percent of the morpholides of oleic, palmitic, and linoleic acids comprising the morpholide mixture, respectively.

TABLE I

| Example No. | M, Percent | S, Percent | P, Percent | M/S+M+P | P/M+P | S/S+P | Compatibility [1] |
|---|---|---|---|---|---|---|---|
| 1 | 60.5 | 38.1 | 1.3 | 61/100 | 2/100 | 97/100 | C |
| 2 | 51.2 | 47.7 | 1.1 | 51/100 | 2/100 | 98/100 | C |
| 3 | 78.6 | 14.5 | 6.8 | 79/100 | 8/100 | 68/100 | C |
| 4 | 71.4 | 19.2 | 9.3 | 71/100 | 12/100 | 67/100 | C |
| 5 | 80.7 | 9.8 | 9.5 | 81/100 | 11/100 | 51/100 | C |
| 6 | 37.2 | 61.9 | 0.8 | 37/100 | 2/100 | 99/100 | C |
| 7 | 45.0 | 38.4 | 16.5 | 45/100 | 27/100 | 70/100 | C |
| 8 | 45.5 | 42.0 | 12.3 | 46/100 | 21/100 | 77/100 | C |
| 9 | 35.1 | 43.2 | 21.5 | 35/100 | 38/100 | 67/100 | C |
| 10 | 26.3 | 57.4 | 16.1 | 26/100 | 38/100 | 78/100 | C |
| 11 | 53.8 | 24.2 | 21.9 | 54/100 | 29/100 | 52/100 | C |
| 12 | 63.6 | 19.3 | 16.9 | 64/100 | 21/100 | 53/100 | C |
| 13 | 70.0 | 11.2 | 18.8 | 70/100 | 21/100 | 37/100 | I |
| 14 | 70.0 | 15.0 | 15.0 | 70/100 | 18/100 | 50/100 | C |
| 15 | 43.4 | 36.0 | 20.6 | 43/100 | 32/100 | 64/100 | C |
| 16 | 45.3 | 40.1 | 14.6 | 45/100 | 24/100 | 73/100 | C |
| 17 | 40.5 | 30.0 | 29.5 | 41/100 | 42/100 | 50/100 | I |
| 18 | 30.0 | 69.5 | 0.5 | 30/100 | 2/100 | 99/100 | C |
| 19 | 25.0 | 74.6 | 0.4 | 25/100 | 2/100 | 99/100 | I |

[1] C = Compatible; I = Incompatible.

The sample used in Example 20 was the morpholide of Armour's "animal type acids" (Neofat No. 47), a mixture of fatty acids having the following composition: 10% myristic, 43% palmitic, 9% stearic, 30% oleic, and 8% linoleic acids.

The sample used in Example 21 was the morpholide of Armour's "animal acids" (Neofat No. 65), a mixture of fatty acids having the following composition: 2% myristic, 26% palmitic, 16% stearic, 48% oleic and 8% linoleic acids.

The morpholide of rapeseed fatty acids used in Example 22 was prepared from the composite fatty acids which were obtained by saponification and acidification of rapeseed oil and which consisted of approximately 9.6% linolenic acid, 13.3% linoleic acid, 20.4% oleic acid, 49% erucic acid, and 7.6% saturated fatty acid. The resulting morpholide mixture, for which the composition was such that $M/S+M+P=69/100$, $P/M+P=25/100$, and $S/S+P=25/100$, was tested as a plasticizer for Vinylite VYDR resin was incompatible.

The morpholide sample of Example 23 was made by adjusting the composition of the morpholide mixture of Example 22. The latter was mixed with an equal part by weight of a morpholide mixture the composition of which was such that $M/S+M+P=$ about $75/100$, $P/M+P=$ about 0 and $S/S+P=$ about $100/100$, resulting in a final mixture for which $M/S+M+P=$ about $72/100$, $P/M+P=$ about $14/100$ and $S/S+P=$ about $59/100$. This was found to be a compatible plasticizer for Vinylite VYDR resin.

The compositional data for the morpholide mixtures of Examples 20 to 23 are given in Table II in which table M, S, and P, represent the weight percent of the morpholides of monoolefinic, saturated and polyolefinic fatty acids, respectively, comprising the morpholide mixture, in which morpholide mixture, the saturated acyls containing 18 or more carbon atoms amount to less than about 17% of all the acyls in the morpholide mixture.

epoxyoleic acid with either the morpholide of linoleic acid or with the morpholide of palmitic acid. The morpholide mixtures used in Examples 44, 45, and 46 were ternary mixtures consisting of equal parts by weight of the mixture used in Example 40 and those used in Examples 41, 42, and 43, respectively. The compositions and the results of the compatibility tests for these samples are given in Table IV. The sample of Example 46 was a

TABLE II

| Example No. | M, Wt. Percent | S, Wt. Percent | P, Wt. Percent | M/S+M+P | P/M+P | S/S+P | Compatibility [1] |
|---|---|---|---|---|---|---|---|
| 20 | 30 | 62 | 8 | 30/100 | 21/100 | 89/100 | C |
| 21 | 48 | 44 | 8 | 48/100 | 14/100 | 85/100 | C |
| 22 | 69.4 | 7.6 | 23.0 | 69/100 | 25/100 | 25/100 | I |
| 23 | 72.2 | 16.3 | 11.5 | 72/100 | 14/100 | 59/100 | C |

[1] C=Compatible; I=Incompatible.

The physical properties of the Vinylite VYDR resin plasticized with the morpholide mixtures of Examples 20 to 23 are shown in Table III.

compatible vinyl chloride plasticizer though it was made by mixing the samples of Examples 40 and 43 both of which were incompatible.

TABLE III

| Example No. | Plasticizer, Morpholide of— | Tensile Strength, p.s.i. | 100% Modulus, p.s.i. | Elongation, percent | Brittle Point, °C. | Volatility | Compatibility [1] |
|---|---|---|---|---|---|---|---|
| 20 | Animal type acids | 2,940 | 1,390 | 400 | −30 | 0.62 | C |
| 21 | Animal acids | 2,950 | 1,370 | 390 | −34 | 0.36 | C |
| 22 | Rapeseed oil acids | 3,030 | 1,470 | 400 | −53 | 1.00 | I |
| 23 | Adjusted rapeseed oil acids | 2,880 | 1,330 | 360 | −43 | 0.55 | C |
| 24 | Epoxyoleic acid | 3,030 | 1,270 | 360 | −16 | 0.41 | C |
| 25 | Epoxystearic acid | 2,850 | 1,300 | 350 | −28 | 0.54 | C |
| 26 | Diepoxystearic acid | 2,950 | 1,330 | 350 | −16 | 0.49 | C |
| 27 | Partially epoxidized cottonseed oil acids | 2,940 | 1,210 | 400 | −26 | 0.73 | C |
| 28 | Fully expoxidized cottonseed oil acids | 2,990 | 1,310 | 360 | −22 | 0.72 | C |

[1] C=Compatible; I=Incompatible.

The corresponding data for Examples 24 to 29 are given in Tables III and/or IV. For these samples, M, E, S, and P represent the approximate weight percent of morpholides of monoolefinic (unepoxidized), epoxidized, saturated and polyunsaturated acids, respectively, comprising the morpholide mixtures, in which morpholide mixtures the saturated acyls containing 18 or more carbon atoms amount to less than about 17% of all the acyls in the morpholide mixture. The morpholide samples of Examples 27 and 28 were prepared by epoxidation of the morpholide of cottonseed oil fatty acids to an oxirane oxygen content of 2.62% and 4.07%, i.e., to an extent equivalent to that necessary to epoxidize about 40% and about 100%, respectively, of the total number of double bonds present.

The morpholide sample of Example 29 was prepared by mixing the proper proportions of the morpholide mixture of Example 28 and the morpholide of selectively hydrogenated cottonseed fatty acids. The plasticized resin had a specially high degree of thermal stability.

The morpholide mixtures used in Examples 30 to 36, for which the compatibility data are given in Table IV, were prepared by mixing the proper proportions of the morpholides of oleic acid, epoxyoleic acid, and palmitic acid.

The morpholide mixtures used in Examples 37, 38, 39, 40, 41, 42, and 43 were binary compositions prepared by mixing appropriate proportions of the morpholide of

TABLE IV

| Example No. | M | E | S | P | E/E+S | E/P+E | Compatibility [1] |
|---|---|---|---|---|---|---|---|
| 24 | 0 | 100 | 0 | 0 | 100/100 | 100/100 | C |
| 25 | 0 | 100 | 0 | 0 | 100/100 | 100/100 | C |
| 26 | 0 | 100 | 0 | 0 | 100/100 | 100/100 | C |
| 27 [2] | 25 | 50 | 25 | 0 | 75/100 | 100/100 | C |
| 28 | 0 | 75 | 25 | 0 | 75/100 | 100/100 | C |
| 29 [2] | 61 | 6 | 27 | 6 | | | C |
| 30 | 0 | 60 | 40 | 0 | 60/100 | 100/100 | C |
| 31 | 0 | 55 | 45 | 0 | 55/100 | 100/100 | C |
| 32 | 0 | 45 | 55 | 0 | 45/100 | 100/100 | I |
| 33 [2] | 20 | 30 | 50 | 0 | | | C |
| 34 [2] | 17.7 | 26.8 | 55.5 | 0 | | | C |
| 35 [3] | 15 | 23 | 62 | 0 | | | C |
| 36 [3] | 12 | 18 | 70 | 0 | | | I |
| 37 | 0 | 40 | 60 | 0 | 40/100 | 100/100 | I |
| 38 | 0 | 35 | 65 | 0 | 35/100 | 100/100 | I |
| 39 | 0 | 30 | 70 | 0 | 30/100 | 100/100 | I |
| 40 | 0 | 25 | 75 | 0 | 25/100 | 100/100 | I |
| 41 | 0 | 75 | 0 | 25 | 100/100 | 75/100 | C |
| 42 | 0 | 70 | 0 | 30 | 100/100 | 70/100 | C |
| 43 | 0 | 65 | 0 | 35 | 100/100 | 65/100 | I |
| 44 | 0 | 50 | 37.5 | 12.5 | 57/100 | 80/100 | C |
| 45 | 0 | 47.5 | 37.5 | 15 | 56/100 | 76/100 | C |
| 46 | 0 | 45 | 37.5 | 17.5 | 54/100 | 72/100 | C |

[1] C=Compatible; I=Incompatible.
[2] Compositions containing the morpholides of both monounsaturated fatty acids and epoxidized fatty acids, and which can be prepared by mixing appropriate proportions of two morpholide mixtures each of which is a compatible vinyl chloride plasticizer.
[3] Compositions containing the morpholides of both monounsaturated fatty acids and epoxidized fatty acids, and which can be prepared by mixing two morpholide mixtures each of which is an incompatible vinyl chloride plasticizer. For example, the sample of Example 36 can be prepared by mixing equal parts by weight of two incompatible morpholide mixtures, one consisting of 25 parts of the morpholide of a monounsaturated acid and 75 parts of the morpholide of palmitic acid and the other consisting of 35 parts of the morpholide of epoxyoleic acid and 56 parts of the morpholide of palmitic acid.

We claim:
1. The morpholides of a mixture of epoxidized fatty acids, saturated fatty acids, and polyunsaturated fatty acids in which mixture of acids the weight proportions of saturated acids (S), epoxidized acids (E), and polyunsaturated acids (P), are such that all of the following conditions are satisfied: (1) that E/S+E is greater than about 50/100; (2) that E/P+E is greater than about 70/100; (3) that the saturated acids present in the mixture of acids are saturated acids containing from 12 to 18 carbon atoms; and (4) that the percentage of saturated acids containing at least 18 carbon atoms in said mixture of acids is less than about 17% of all the acids in the mixture.

References Cited

UNITED STATES PATENTS 2,863,845   12/1958   Magne et al. _____ 260—30.4

OTHER REFERENCES

Magne et al., Industrial and Engineering Chemistry, vol. 50, No. 4, April 1958, pp. 617 and 618.

ALLAN LIEBERMAN, *Primary Examiner.*
MORRIS LIEBMAN, *Examiner.*